United States Patent [19]

Clark

[11] Patent Number: 5,036,950
[45] Date of Patent: Aug. 6, 1991

[54] APPARATUS FOR GREASING A BEARING

[76] Inventor: Jimmy E. Clark, 109 Farrs Bridge Rd., Greenville, S.C. 29611

[21] Appl. No.: 555,180

[22] Filed: Jul. 20, 1990

[51] Int. Cl.⁵ .............................................. F16C 1/24
[52] U.S. Cl. ...................................... 184/7.4; 184/5.1
[58] Field of Search ...................... 184/5, 5.1; 141/357

[56] References Cited

U.S. PATENT DOCUMENTS

| | | | |
|---|---|---|---|
| 2,178,816 | 11/1939 | Sibley | 184/5.1 |
| 2,309,820 | 2/1943 | Berg | 184/5.1 |
| 2,489,809 | 11/1949 | Owens | 184/5.1 |
| 2,702,092 | 2/1955 | Douglass | 184/5.1 |
| 2,729,305 | 1/1956 | Hamel | 184/5.1 |
| 3,365,024 | 1/1968 | Freda | 184/5.1 |
| 4,168,766 | 9/1979 | Shultz | 184/5.1 |
| 4,345,667 | 8/1982 | Shultz | 184/5.1 |
| 4,405,035 | 9/1983 | Shultz | 184/5.1 |

Primary Examiner—Ira S. Lazarus
Assistant Examiner—Alan B. Cariaso
Attorney, Agent, or Firm—Bailey & Hardaway

[57] ABSTRACT

Apparatus for actuating a bearing packer having a cylindrical grease containing housing with a piston operated by a compression application member includes a flat base member carrying a vertical standard and a vertical cylindrical member positioning said grease containing housing for receiving an axial force delivered by a pivoted lever carried for vertical adjustment by the standard through a link carried on the lever for alignment with the compression application member.

3 Claims, 2 Drawing Sheets

APPARATUS FOR GREASING A BEARING

BACKGROUND OF THE INVENTION

This invention relates to apparatus for actuating a bearing packer while supporting a grease containing housing while force is applied through a lever.

Bearing packers of the type having a plastic cup or cylindrical grease containing housing having an open end for receiving a piston carrying a centrally positioned bearing have provided forceful means for actuating the piston to inject grease into the bearing. Such forceful means include a common vise or the hands of the operator which are placed palms down one on top of the other against a compression force applicator carried by the piston. U.S. Pat. Nos. which illustrate such devices include U.S. Pat. Nos. 4,168,766, 4,345,667, and 4,405,035.

The expedients described above for delivering force to the piston have proved to be either injurious to the bearing packer, especially the plastic cup, or wasteful of the packing grease. Both are awkward and time consuming. Unless the force of the vise is applied substantially axially with considerable accuracy, there is a tendency to crack the cup or housing. Since the hands obscure the bearing from sight, it is difficult and messy to determine when sufficient grease has been applied.

Additional prior art is illustrated in U.S. Pat. Nos. 2,178,816, 2,309,820 and 2,729,305 which illustrate the use of vertical stands carrying pivoted arms for applying a vertical force for packing bearings, but no means is provided for positioning and protecting the cup of the bearing packer or for assuring the application of a vertical force thereby.

Accordingly, it is an important object of this invention to provide a simple device for effectively exerting an axial force for operating a bearing packer having a cylindrical grease containing housing.

Another important object of the invention is the provision of a press which is readily disassembled or collapsible for convenient transport.

Still another important object of the invention is to avoid damage to the compressible bearing packers by protecting the plastic cup and providing proper alignment, and to avoid wasting packing grease.

SUMMARY OF THE INVENTION

Apparatus is provided for actuating a bearing packer having a cylindrical grease containing housing or cup with a piston carrying a bearing centrally in an upper recess operated by a compression application member for squeezing grease through an opening which may include circumferentially spaced vertical passageways in the piston into the bearing. A flat base member carries a vertical stand and a vertical cylindrical member positioning said grease containing housing for receiving an axial force delivered by a pivoted arm or lever carried for vertical adjustment by the standard through a link carried on the arm for alignment with the compression application member.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
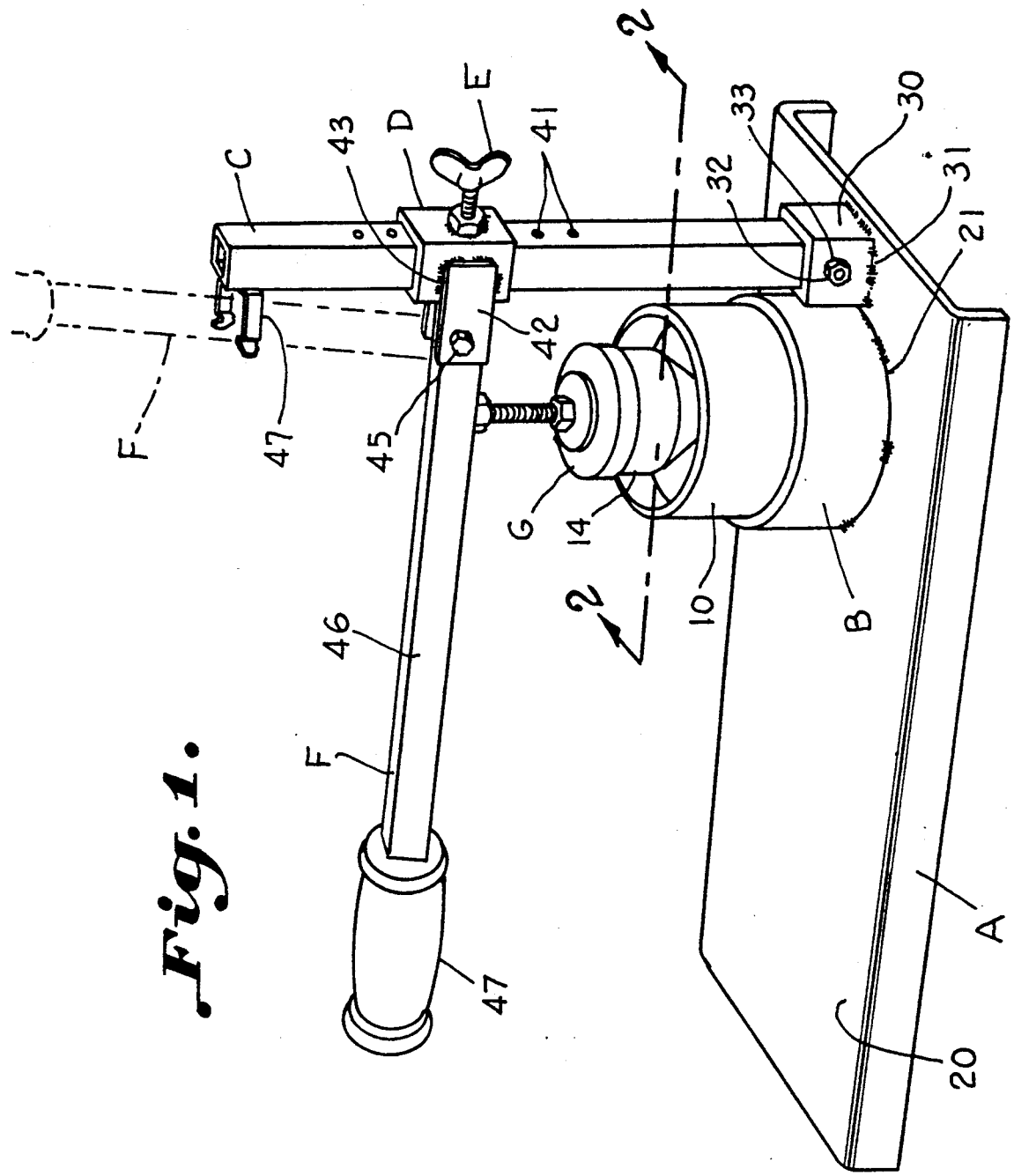
FIG. 1 is a perspective view illustrating a bearing packer positioned in a cylindrical receptacle of an apparatus constructed in accordance with the invention with a force applying member positioned to apply an axial force to pack a bearing.
Figure 2:
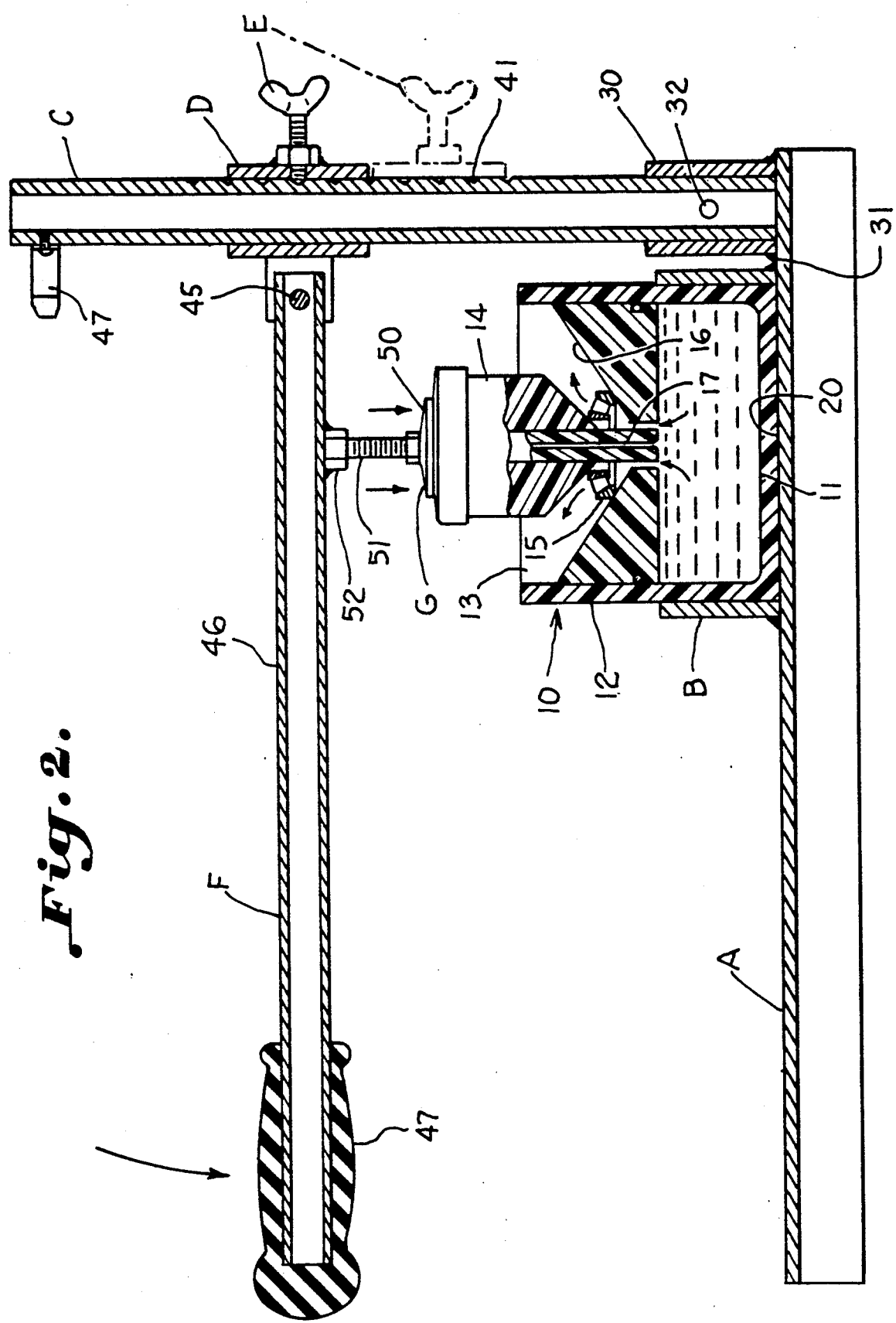
FIG. 2 is a longitudinal sectional elevation further illustrating the apparatus of FIG. 1 applying a vertical force to the bearing packer.

The drawings illustrate apparatus for actuating a bearing packer having a cylindrical grease containing housing or cup including an open end accommodating a piston carrying a bearing in an upper tapered receptacle operated by an axial compression application member forcing grease through an opening in the piston and into the bearing. A base member A has a flat upper surface carrying a vertical, open cylindrical member B receiving and positioning the cylindrical housing upon the base. A vertical stand C is carried by the base adjacent to cylindrical housing. A pivotal mounting member D is carried by the standard. Means E is provided for vertically adjusting the pivotal mounting member on the stand. A lever arm F is pivotally mounted on one end to the pivotal mounting member, and a force applying member G is carried by the lever arm. The force applying member G is spaced from the stand to exert a substantially vertical force axially thereof upon the compression application member so that grease is forced into the bearing.

The bearing packer is illustrated as having a cylindrical grease containing housing or cup broadly designated at 10 which includes a base 11 with cylindrical walls 12 having an open upper end 13 accommodating a piston 14 carrying a bearing 15 within a tapered receptacle 16. The piston 14 is operated by an axial compression application member G in the form of a disc to force grease through the passageway 17 and into the bearing to pack the bearing, as for example, for use in the hub of an automotive wheel.

The drawings further illustrate an apparatus including a base member A which is elongated having an upper surface 20 for accommodating the base member 11 of the cylindrical grease containing housing 10. A vertical open cylindrical member B is suitably secured to the surface 20 as by welding as at 21. The tolerance should be close within the inner surface of the member B to accommodate and offer support to the wall 12 of the grease containing housing or cup 10. The surface 20 within the confines of the cylindrical member B is substantially planar or flat to accommodate the bottom of the base 11 and any projections as may be carried thereby to stabilize the base for exerting a compressor force between the piston and the cup in order to force grease into the bearing for packing same.

The vertical stand C is carried laterally of the cylindrical housing adjacent one end of the elongated base member A and is secured within an upright hollow support member 30 secured as by welding 31 to the base. A transverse threaded member passes through the upright support 30 and the vertical stand C as illustrated at 32 and is secured into position by the nut 33.

The stand C carries a pivotal mounting member D which is vertically adjustable thereon. The mounting member D includes a slide 40 carried by the stand and has a threaded wing nut E which vertically adjusts the pivoted mounting member on to the stand by engagement within one of the spaced depressions 41 within the stand. A pair of opposed bracket members 42 are suitably secured as by welding at 43 to the slide member 40, and the lever arm or handle F is pivotally connected as at 45 thereto. The arm includes an elongated shank 46 having a handle 47. The handle may be retired behind the spring clip member 47, the handle being illustrated in broken line raised position in FIG. 1. The force applying member G preferably includes a disc 50 carried by a threaded shank 51 carried at right angles to the arm 46 within an internal threaded nut 52 suitably secured to the arm as by welding.

OPERATION

The apparatus for greasing a bearing operates with the grease cup of a bearing packer utilizing a piston which must be axially depressed.

The bearing packer cup is placed inside the cylindrical receptacle on the base. The bearing is positioned in the bearing packer cup as usual. Using the thumb screw the height of the lever mounting to the vertical stand is adjusted to allow the bearing disc to rest flat on top of the bearing packer compression member. Using the horizontal lever, pressure is applied until the bearing is fully packed.

It is thus seen that the bearing packing operation is simplified and expedited. This apparatus eliminates the waste of packing grease and the mess associated with the hand packing bearings used heretofore.

While a preferred embodiment of the invention has been described using specific terms, such description is for illustrative purposes only, and it is to be understood that changes and variations may be made without departing from the spirit or scope of the following claims.

What is claimed is:

1. Apparatus for actuating a bearing packer having a grease containing housing including an open end accommodating a piston carrying a bearing centrally in an upper recess operated by an axial compression application member forcing grease through an opening in the piston and into the bearing comprising:
   an elongated base member;
   a vertical, open receptacle receiving and positioning said housing upon said base;
   a vertical stand carried by said base laterally of cylindrical housing;
   a pivotal mounting member carried by said stand;
   means for vertically adjusting said pivotal mounting member on said stand;
   a lever arm pivotally mounted on one end on the pivotal mounting member;
   a force applying member carried by said lever arm; and
   said force applying member being spaced from said stand to exert a substantially vertical force substantially axially thereof upon said compression application member when said pivotal mounting member is in a vertically adjusted position on said stand;
   whereby grease is forced into said bearing.

2. Apparatus for actuating a bearing packer having a cylindrical grease containing housing including an open end accommodating a piston carrying a bearing centrally in an upper recess operated by an axial compression application member forcing grease through an opening in the piston and into the bearing comprising:
   a base member;
   a vertical, open cylindrical receptacle receiving and positioning said cylindrical housing upon said base;
   a vertical stand carried by said base laterally of cylindrical housing;
   a pivotal mounting member carried by said stand;
   means for vertically adjusting said pivotal mounting member on said stand;
   a lever arm pivotally mounted on one end on the pivotal mounting member;
   a force applying member carried by said lever arm; and
   said force applying member being spaced from said stand to exert a substantially vertical force substantially axially thereof upon said compression application member;
   said pivotal mounting member having a slide carried on said stand, a threaded height adjusting member on said slide, and an offset bracket on which said lever arm is pivotally mounted;
   whereby grease is forced into said bearing.

3. The structure set forth in claim 2 including a mounting member carried by the base upon which the stand is removably mounted.

* * * * *